(No Model.)
C. E. STRANGE.
MUD GUARD FOR BICYCLE WHEELS.
No. 512,069. Patented Jan. 2, 1894.
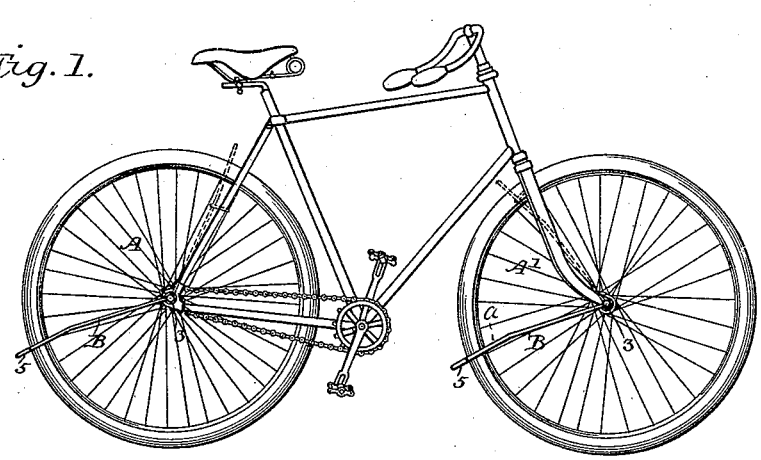
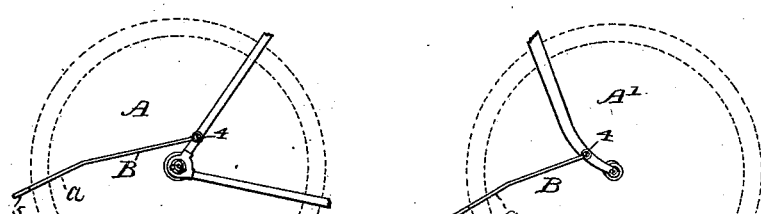

UNITED STATES PATENT OFFICE.

CHARLES E. STRANGE, OF TAUNTON, MASSACHUSETTS.

MUD-GUARD FOR BICYCLE-WHEELS.

SPECIFICATION forming part of Letters Patent No. 512,069, dated January 2, 1894.

Application filed March 11, 1893. Serial No. 465,553. (No model.)

*To all whom it may concern:*

Be it known that I, CHARLES E. STRANGE, a citizen of the United States of America, residing in Taunton, in the county of Bristol, in the State of Massachusetts, have invented a new and useful Mud-Guard for Bicycle-Wheels, of which the following is a specification.

My invention relates to improvements in mud guards for bicycle wheels and the object is to provide a simple and efficient device for the purpose of preventing the mud and dirt taken up by the wheels from being thrown farther than the mud guard in its relation to the wheel to which attached; and a further object is to provide a mud guard which may be attached by simple means to any bicycle, and which may be adjusted to any desired position, or turned up out of the way, as desired.

I have fully and clearly illustrated my invention in the accompanying drawings, wherein—

Figure 1 is a side elevation of a well known form of bicycle, having my new mud guard attached to the ends of the axles of the wheels. Fig. 2 is a detail showing the arms of the mud guard attached to the fork and rear braces, and Fig. 3 is a plan view of the mud guard detached from the bicycle.

A, A' designate, respectively, the driving or rear wheel and the front wheel of a safety bicycle; my invention being applicable to either or both wheels, it being the purpose to connect it either to the axles of the wheels or to the fork or brace rods as may be desired and considered most convenient as indicated in the drawings.

B designates the frame of the mud guard, consisting of a single piece of steel wire or rod bent in a long U-shape substantially as shown, and having the ends formed with eyes or holes 1, 2, adapted to take in the opposite end of the axles of the wheels, and be clamped sufficiently tight thereto and thereon, by end-nuts 3; or the ends may be fitted to bolts or lugs 4, in the fork or braces as indicated in Fig. 2, and then secured by clamping-nuts on the threaded ends of the bolts or lugs. The frame at the bend may be struck from the line of the arms, as seen at *a*. On the bend or turn of the frame is secured the mud guard 5 consisting of india rubber or leather and embracing the arms of the frame for the requisite and proper distance toward the wheel and forming a light elastic or flexible connection between the arms of the frame constituting an obstruction and stop, against which the mud and dirt impinge when thrown up by the motion of the wheels. The yielding or elastic character of the guard has a tendency to throw the dirt downward as it contacts with it, and thus prevent adherence thereto.

The guard can be turned up as shown in dotted lines and held to the frame or fork by any desired means. This mud guard is simple in construction and of little weight and when in connection with the wheel prevents the mud from being carried beyond it, to the back or on the legs of the rider.

Having described my invention, what I claim, and desire to secure by Letters Patent, is—

In combination with a wheel, a mud guard composed of a single piece of metal bent into U shape and provided with eyes in the ends to attach it to a support, and a yielding plate secured at the bend of the arms and extending inward, and across and between the arms substantially as and for the purpose specified.

In witness whereof I have hereto set my hand in the presence of two attesting witnesses.

CHARLES E. STRANGE.

Witnesses:
 WALTER J. EAMES,
 JAMES F. KENELY.